Sept. 11, 1945.                E. F. FLINT                2,384,540
                            OBSERVATION DEVICE
                          Filed Aug. 26, 1942            3 Sheets-Sheet 1
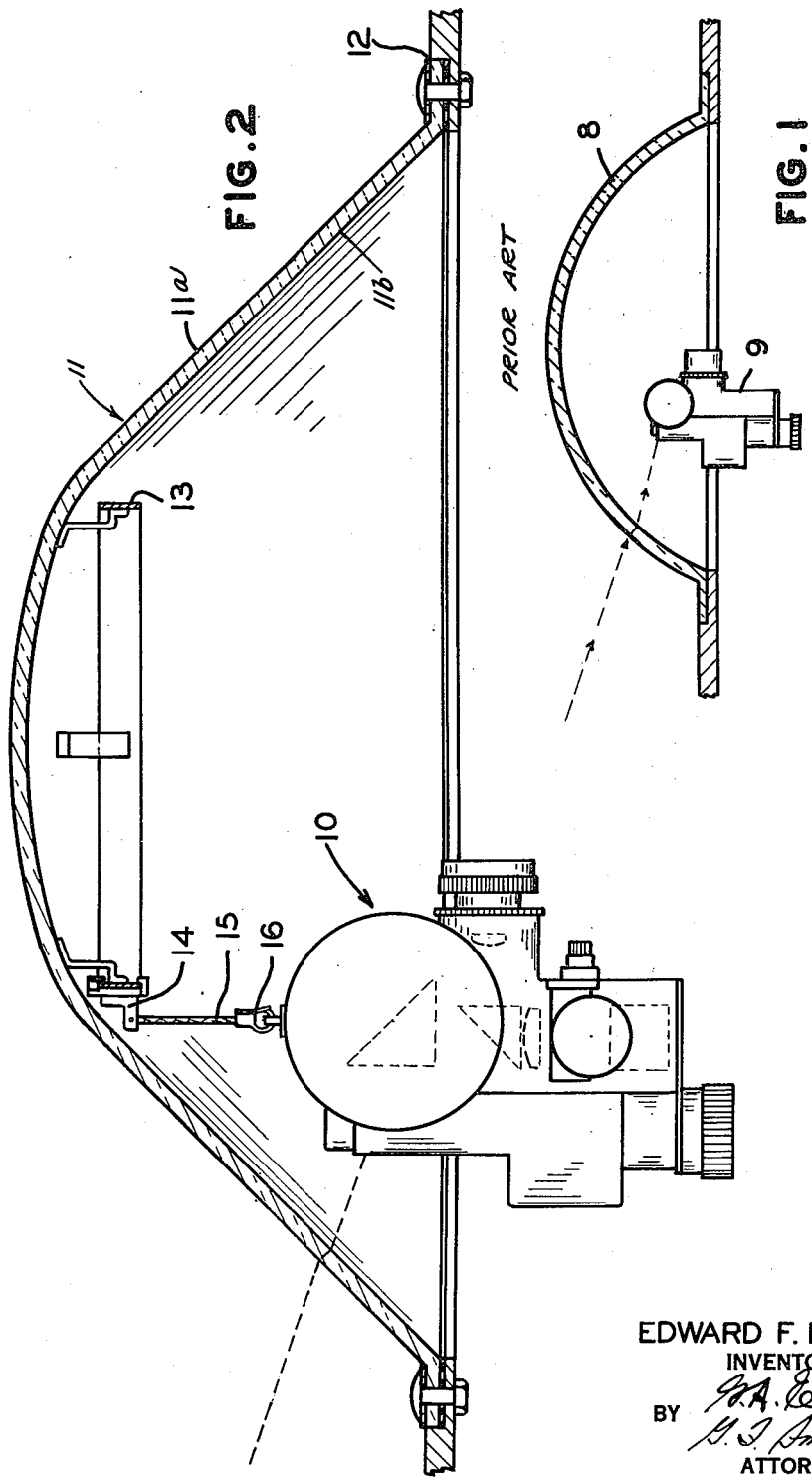
EDWARD F. FLINT
INVENTOR
BY
ATTORNEYS Sept. 11, 1945.  E. F. FLINT  2,384,540
OBSERVATION DEVICE
Filed Aug. 26, 1942   3 Sheets-Sheet 2
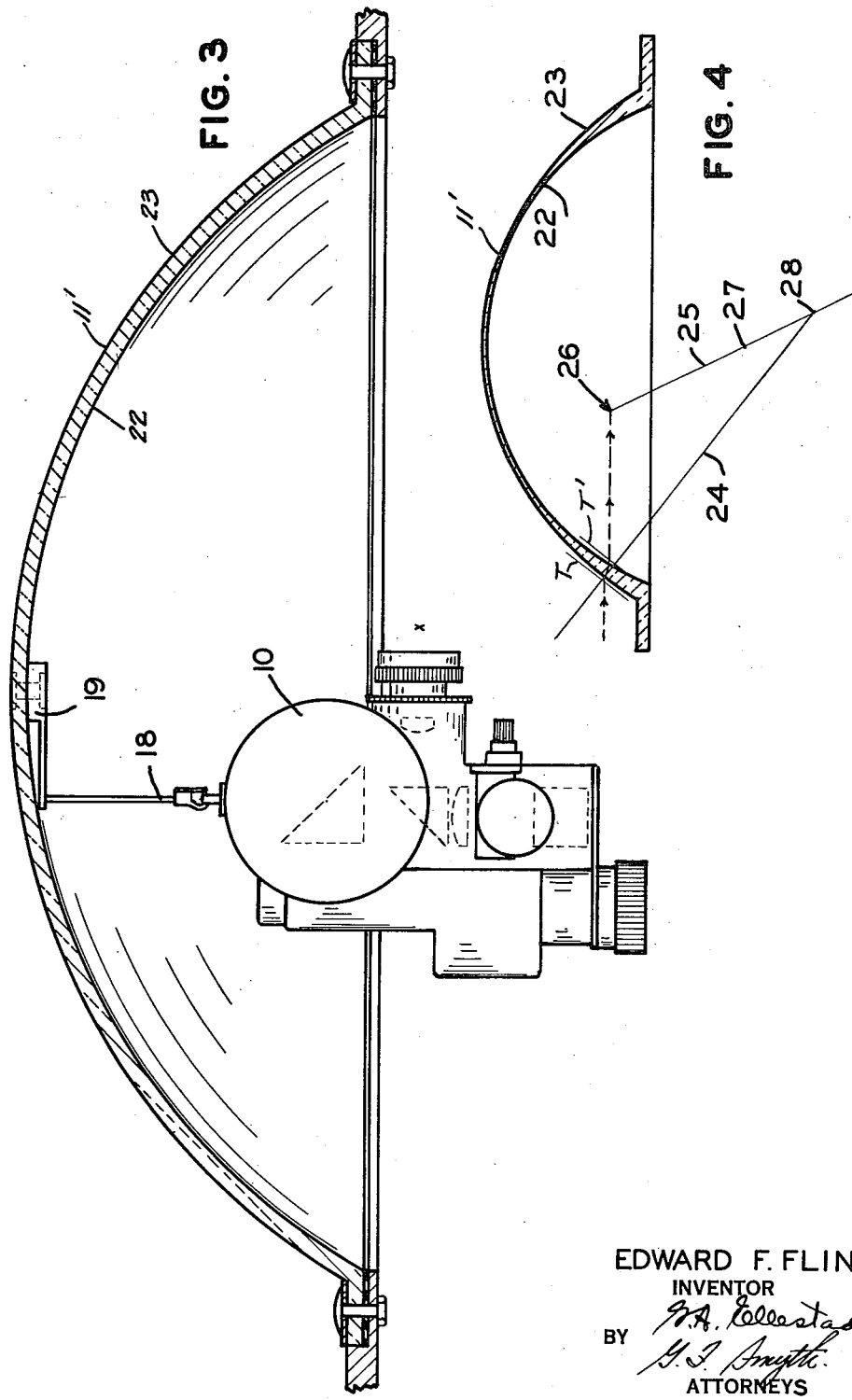
EDWARD F. FLINT
INVENTOR
BY
ATTORNEYS Sept. 11, 1945.  E. F. FLINT  2,384,540
OBSERVATION DEVICE
Filed Aug. 26, 1942  3 Sheets-Sheet 3

EDWARD F. FLINT
INVENTOR
BY
ATTORNEYS

Patented Sept. 11, 1945

2,384,540

UNITED STATES PATENT OFFICE 2,384,540

OBSERVATION DEVICE

Edward F. Flint, Rochester, N. Y., assignor to Bausch & Lomb Optical Company, Rochester, N. Y., a corporation of New York Application August 26, 1942, Serial No. 456,237

3 Claims. (Cl. 88—1)

This invention relates to observation devices and more particularly, to a dome having a transparent portion and an instrument mounted therein for movement in a predetermined path relative to the transparent portion.

The device of present invention in the broadest aspects thereof may be used for making any observation desired and is particularly adapted for use with aircraft as an astro-dome for celestial observation used in aerial navigation.

The device, for the purpose of illustrating the invention, has been shown and described as an astro-dome for aircraft. Astro-domes or observation blisters in present-day aircraft, are formed on the upper portion of the fuselage or body of the craft and to reduce air resistance are generally formed as spherical segments and only large enough to accommodate the instrument, generally an octant, and a portion of the observer's head. Thus the instrument must be held in a position displaced from the center of curvature of the dome and all light rays obliquely entering the instrument are refracted and angularly deviated by the spherical surfaces of the wall of the dome. As the inclination of a light ray is measured by instruments such as an octant this deviation produces errors in the measurements taken by the instrument.

If the path of movement of the instrument was predetermined and the curvature of the dome known, the error could be determined for each measurement within the range of the instrument. After the error had been determined, the reading of the instrument then could be corrected but as this increased the number of calculations the possibility of error was likewise increased.

One of the objects of the present invention is to produce an observation device in which the incident ray of the instrument is parallel to the incident ray of the dome so that no angular deviation of the ray occurs. Thus as there is no angular deviation of the ray, readings may be taken directly from the instrument. This reduces the number of calculations necessary to determine position and consequently reduces the possibility of error.

In some forms of the present invention the surfaces of the wall of the dome are so constructed and so arranged that the refracted or exit ray of the dome which is the incident ray of the instrument, is parallel to the incident ray of the dome while in a modified form of the invention, a supplemental lens in the optical path of the instrument maintains the incident ray of the instrument parallel to the incident ray of the dome. The surfaces of the lens are such that angular deviation, produced by the wall of the dome, is corrected before the ray enters the instrument. As the lens may be carried by the instrument itself, measurements of an instrument provided with such a supplemental lens may be used with an existing dome and readings may be directly read from the scale of the instrument.

Other objects and advantages will appear from the following description taken in connection with the accompanying drawings in which:

Figure 1 is a vertical section through an existing astro-dome.

Figure 2 is an elevation shown partly in section of one form of the observation device of the present invention.

Figure 3 is a view similar to Figure 1, but showing a modified form of the present invention.

Figure 4 is a sectional view of the dome of Figure 3, in which the wall of the dome is exaggerated to more clearly illustrate the relative position of the surfaces of the same wall.

Figure 5:
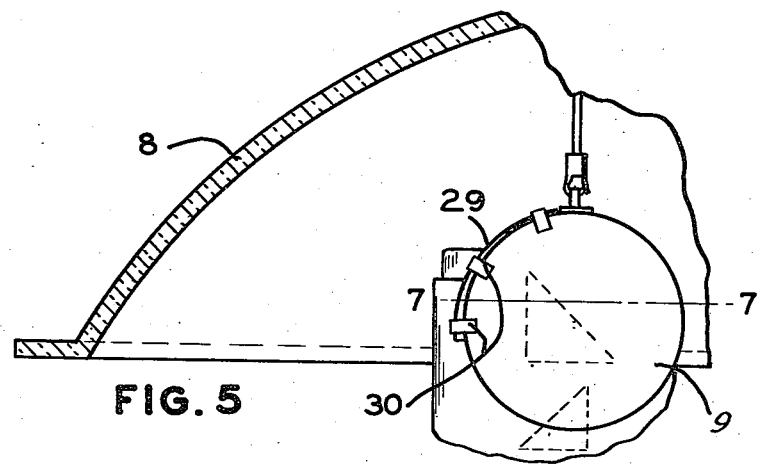
Figure 5 is a fragmentary view partly in elevation and partly in sections, showing a still further modified form of the present invention.

In present day aircraft construction, astro-domes comprise thin walled, transparent, spherical sections, such as shown at 8 in Figure 1 secured to the upper portion of the fuselage or body of the craft. To reduce air resistance, such domes are merely large enough to accommodate the instrument 9 and a portion of the observer's head. As the size of the dome had to be kept small, the center of curvature of the dome lay within the body of the aircraft and the octant 9 was mounted for movement about a circle having a center coincident with the vertical axis of the dome. With the octant moving about such a path, an observer was able to place his head within the dome, but the spherical surfaces of the wall of the dome throughout substantially the entire range of the instrument, produced an angular deviation of the light ray from the celestial body the angular elevation of which was being measured, and this deviation as graphically shown by the broken line in Figure 1, created an error in the readings given by the instrument. If the point of indices of the instrument, that is, that point determined by the intersection of all incident rays of the instrument in any plane of measurement of the same was known and moved in a predetermined path about the axis of the dome, this error could be determined for each measurement within the range of the instrument. The error could then be compensated for, but this increased the time of determining the position of the craft and also introduced into the calculations, a possible source of error.

This inherent fault of existing domes is a serious one for accurate navigation depends to a very large extent upon the accuracy with which an observer can determine his position with relation to some celestial body.

The device of the present invention, referring now to Figure 2 of the drawings, comprises an instrument 10, for the purpose of illustrating the invention shown here as an octant, mounted for movement within a dome 11 of some suitable transparent material.

The dome 11 as will hereinafter more fully appear, is well adapted for use as an aircraft astrodome and is formed with a flange 12 by means of which the dome may be secured to a supporting surface such as the fuselage of an aircraft.

In the form of the invention as illustrated in Figure 2, the dome 11 is formed frusto-conical in shape and the two surfaces 11a and 11b of the wall of the dome, in all planes containing the major axis of the dome and the point of indices of the instrument are parallel so that there is no prismatic effect in these planes, which are the planes of measurement of the instrument, and light rays passing through the wall in these planes are not angularly deviated as illustrated in broken lines in Fig. 2. Although some lateral displacement of the ray takes place in certain sections of the range of the instrument, this does not affect the accuracy of the measurements taken for the displaced ray is still parallel to the incident ray of the dome and consequently the inclination of the displaced ray is the same as that of the incident ray of the dome.

The upper portion of the dome 11 is faired over to reduce air resistance and as shown, the fairing may comprise a spherical segment enclosing the upper portion of the dome. This section of the dome, as it is not within the range of the instrument, is used to support a track 13 on which a carriage 14 moves. A strap 15 depending from the carriage 14, suspends the octant within the dome for movement in the path defined by the track 13. To permit the octant to be readily removed from the dome, a snap-hook 16 may be used to secure the octant to the strap 15.

There is shown in Figure 3 a modified form of the present invention wherein the instrument 10 again shown as an octant is detachably secured to a strap 18, suspended from a pivotally mounted arm 19, moving about a center coincident with the vertical axis of the dome 11'.

The relative positions of the two surfaces of the dome 11' are shown in the exaggerated illustration of Figure 4 in which the inner surface 22 is the spherical surface. The inner surface 22 and the outer surface 23 are so related that a plane T, tangent to the outer surface at the point where the light ray strikes the surface 23, is parallel to a plane T' which is tangent to the inner surface 22 at a point where the ray emerges from the surface 22. The center of revolution of the other surface 23 in any measurement plane is determined by the intersection of a line 24 normal to the tangent T at an incident or entrance point of a ray in that plane and a line 25 through the point of indices 26 of the instrument and the center of curvature 27 of the spherical surface 22. It will be seen that the center of revolution of the surface 23, indicated at 28, will revolve as the point of indices 26 of the instrument moves about its predetermined path of movement.

Thus one surface of the wall of the dome in this form of present invention is a spherical surface having a fixed center of curvature while the other is such a surface that all tangents at ray entrance or exit points are parallel to tangents at the corresponding exit or entrance points of the spherical surface.

The surfaces of the wall of the dome 11' are not parallel and due to their relative position and curvature any ray passing through the wall to the point of indices 26 will not be deviated in the measurement plane after emerging from the wall of the dome. This is graphically shown in the exaggerated view of Figure 4 by the broken line.

In the just discussed forms of the present invention the domes have been considered as new constructions and to overcome the inherent defects of the existing domes the present invention provides means in the optical path of the instrument for correcting the deviation produced by the walls of domes such as shown in Figure 1. Although the lens may be carried by the wall of the dome, in the preferred embodiment of this form of the invention, referring now to Figure 5, the lens 29 is carried by the instrument 9 and moves with the instrument as the same is moved about its predetermined path of movement. The lens 29 is removably secured to the one face of the instrument 9 in such a position as to be within the optical path of same. Any means desired may be used to detachably secure the lens to the instrument and as shown this means may comprise a plurality of spring fingers 30 for gripping opposite sides of the instrument casing.

Figure 6:
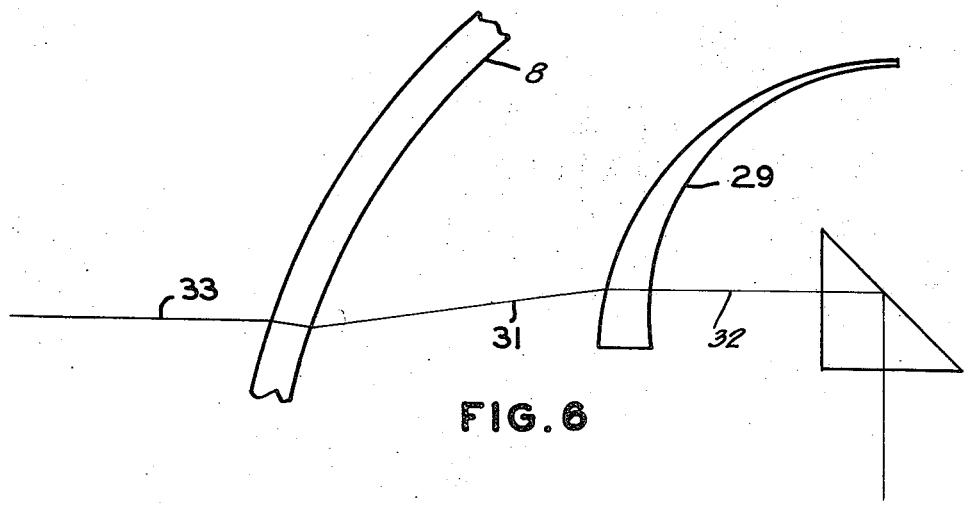
Figure 6 is a schematic view showing the path of a light ray in the form of the invention shown in Figure 5.
Figure 7:
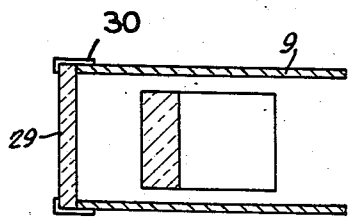
Figure 7 is a sectional view taken along line 7—7 of Figure 5.

The lens 29, referring now to Figure 6, is so formed that a deviated light ray 31 passed through the wall of the dome 8 is so deflected as it emerges from the lens that the deflected ray 32 enters the instrument 9 in a path parallel to the path of the incident ray 33 of the dome. Thus instruments equipped with such a supplemental lens may be used with existing domes and measurements taken by such so-equipped instruments will be correct.

It will be seen that all forms of the invention eliminate the difficulty heretofore encountered by maintaining the incident ray of the instrument parallel to the incident ray of the dome. As the incident ray 32 of the instrument is parallel with the incident ray 33 of the dome 8, there is no angular deviation and the reading of the instrument 9 as it is correct need not be modified before it can be used in the calculations to determine the position of the craft. Thus the time necessary to calculate the position has been reduced and the possibility of error caused by the step of compensating for the error has been eliminated.

While certain preferred embodiments of the invention have been illustrated and described herein, it is to be understood that the invention is not limited thereby but is susceptible of changes in form and detail within the scope of the appended claims.

I claim:

1. The combination of a housing, a curved transparent observation window forming at least a part of the housing, said window having an outer convex face forming at least a part of a surface of revolution and an inner concave face forming at least a part of a surface of revolution, said surfaces of revolution having coincident axes, a light receiving member positioned within the housing to receive light rays passing through the window, said member being positioned between the window and said axes of revolution, the thickness of said window varying in an observation plane which includes the axes of revolution and intersects the window, the thinnest portion of the window being located at the point in the observation plane where the window is intersected by a line passing through the centers of curvature of both surfaces, the thickness of the window being such at all points in the observation plane that a plane tangent to the outer face at a point where an incident light ray strikes the outer face is substantially parallel to a plane tangent to the inner face at a point where the light ray emerges from the inner face so that light rays passing through the window to said member undergo substantially no deviation.

2. An observation housing comprising a dome shaped transparent member having an outer convex face forming a surface of revolution and an inner concave face forming a surface of revolution, said surfaces of revolution having coincident axes, an optical instrument mounted on a track in said housing to move in an arcuate path about said axes, the thickness of said member increasing downwardly from a point in a vertical measurement plane, a straight line in said plane passing through said point and the centers of curvature of the two faces, a line passing through the center of curvature of the outer surface being perpendicular to two parallel planes which are tangent, respectively, to points where a light ray passing to the point of observation enters the outer face and leaves the inner face of the window whereby the light ray suffers substantially no deviation in passing through the window to the point of observation.

3. A curved transparent observation window having an outer convex face defining at least a portion of a surface of revolution and an inner concave face defining at least a portion of a spherical surface of revolution, the axes of said surfaces of revolution being coincident, a point of observation for an observer located in a housing embodying said window being positioned between the inner face and said axes, the point of observation in a plane passing through the window being located on a straight line passing through the centers of curvature of the two faces, a line passing through the center of curvature of the outer surface being perpendicular to two parallel planes which are tangent, respectively, to points where a light ray passing to the point of observation enters the outer face and leaves the inner face of the window whereby the light ray suffers substantially no deviation in passing through the window to the point of observation.

EDWARD F. FLINT.